United States Patent
Michaux et al.

(10) Patent No.: US 8,236,879 B2
(45) Date of Patent: Aug. 7, 2012

(54) CEMENTING COMPOSITION COMPRISING WITHIN UN-REACTED CEMENT

(75) Inventors: Michel Michaux, Verrieres-le-Buisson (FR); Sylvaine Le-Roy-Delage, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 79 days.

(21) Appl. No.: 12/441,240

(22) PCT Filed: Nov. 15, 2006

(86) PCT No.: PCT/EP2006/010953
§ 371 (c)(1), (2), (4) Date: Nov. 11, 2009

(87) PCT Pub. No.: WO2008/034461
PCT Pub. Date: Mar. 27, 2008

(65) Prior Publication Data
US 2010/0081733 A1     Apr. 1, 2010

(30) Foreign Application Priority Data
Sep. 20, 2006 (EP) .................................. 06291482

(51) Int. Cl.
*C08K 3/00* (2006.01)
(52) U.S. Cl. ......................................................... 524/8
(58) Field of Classification Search ............... 524/2, 8
See application file for complete search history.

(56) References Cited

U.S. PATENT DOCUMENTS

| | | | |
|---|---|---|---|
| 5,575,841 A | 11/1996 | Dry | |
| 5,660,624 A | 8/1997 | Dry | |
| 5,741,357 A | 4/1998 | Sheikh | |
| 5,989,334 A | 11/1999 | Dry | |
| 6,261,360 B1 | 7/2001 | Dry | |
| 6,296,057 B2 | 10/2001 | Thiercelin | |
| 6,458,198 B1 | 10/2002 | Baret et al. | |
| 6,527,849 B2 | 3/2003 | Dry | |
| 2003/0234102 A1 | 12/2003 | Brothers et al. | |
| 2004/0211562 A1 | 10/2004 | Brothers et al. | |
| 2005/0230112 A1* | 10/2005 | Reddy et al. | 166/293 |

(Continued)

FOREIGN PATENT DOCUMENTS

CN     1425627     6/2003

(Continued)

OTHER PUBLICATIONS

"Three designs for the internal release of sealants, adhesives, and waterproofing chemicals into concrete to reduce permeability", Dry. C. M., Cement and Concrete Research 30 (2000) 1969-1977.

*Primary Examiner* — Ling Choi
*Assistant Examiner* — John Uselding
(74) *Attorney, Agent, or Firm* — Matthias Abrell

(57) ABSTRACT

Cementing compositions for use in oilfield applications are designed such that, after setting, a significant amount of cement remains unhydrated. After placement in a subterranean well, the unhydrated cement remains dormant. If the cement sheath becomes damaged, the unhydrated cement hydrates upon exposure to formation fluids, thereby restoring zonal isolation in the wellbore. The compositions comprise emulsions that allow a substantial reduction of the water-to-cement ratio, yet the rheological properties remain suitable for placement in the well.

3 Claims, 2 Drawing Sheets

U.S. PATENT DOCUMENTS

2010/0095871 A1 * 4/2010 Patil et al. ..................... 106/692

FOREIGN PATENT DOCUMENTS

| | | |
|---|---|---|
| EP | 0315243 | 5/1989 |
| EP | 0621247 | 7/1999 |
| EP | 1129047 | 11/2002 |
| WO | 0037387 | 6/2000 |
| WO | 0125163 | 4/2001 |
| WO | 0170646 | 9/2001 |
| WO | 03068708 | 8/2003 |
| WO | 2004101951 | 11/2004 |
| WO | 2004101952 | 11/2004 |

* cited by examiner

CEMENTING COMPOSITION COMPRISING WITHIN UN-REACTED CEMENT

FIELD OF THE INVENTION

The present invention broadly relates to well cementing. More particularly the invention relates to a cement composition that has adaptive properties.

DESCRIPTION OF THE PRIOR ART

Cement in oil and gas wells is placed in the annular gap between the drilled formation and the steel casing. Its main function is to prevent any fluid communication between the drilled formations to provide long-term zonal isolation. Zonal isolation has to be achieved during the life of the well and after its abandonment. The isolation of the various fluid-producing zones through which the well passes is important since it prevents fluids from different layers contaminating each other. For example, the cement prevents formation fluids from entering the water table and polluting drinking water, or prevents water from passing into the well instead of oil or gas The loss of zonal isolation, in absence of chemical attack, can be either due to mechanical failure of the cement itself, or to debonding of the casing from the cement or to debonding of the cement from the formation. Both mechanisms create a high conductivity path for any fluid.

There have been a number of proposals to deal with the problems of deterioration of the cement sheath over time. One approach is to design the cement sheath to take into account physical stresses that might be encountered during its lifetime. Such an approach is described in U.S. Pat. No. 6,296,057. Mathematical modeling of cased cemented wellbores was carried out in order to quantify the deformation mechanism and the amount of damage that is generated downhole. This modeling determines the properties the cement must have to prevent loss of integrity. Cement systems have been developed where the value of elastic parameters meet the requirement for long-term mechanical durability.

Another method to improve the resistance of the cement to physical stresses involves the addition of fibrous or ribbon-like materials to increase the toughness of the cement matrix. U.S. Pat. No. 6,458,198 describes the addition of amorphous metal fibers to the cement slurry to improve its strength and resistance to impact damage. EP 1129047 and WO 00/37387 describe the addition of flexible materials (rubber or polymers) to the cement to confer a degree of flexibility on the cement sheath. WO 01/70646 and WO 03/068708 describe cement compositions that are formulated so as to be less sensitive to the effects of temperature on the cement when setting. The deterioration can be due to physical stresses caused by tectonic movements, temperature variation, pressure variation or various other reasons. While both methods increase the resistance of the cement matrix to physical stresses, none of the previous approaches can accommodate problems that occur once the cement sheath has actually failed and become permeable to a greater or lesser degree.

A number of proposals have been made for designs of self-healing concretes for use in the construction industry. These are described in U.S. Pat. Nos. 5,575,841, 5,660,624, 5,989,334, 6,261,360 and 6,527,849, and in "Three designs for the internal release of sealants, adhesives, and waterproofing chemicals into concrete to reduce permeability", Dry, C. M., Cement and Concrete Research 30 (2000) 1969-1977. None of these are immediately applicable to well cementing operations because of the need for the cement to be pumpable during placement.

Some more recent patents WO 04/101951 and WO 04/101952 describe cementing compositions having self healing properties in contact with the formation fluid, so cementing compositions can be self-repaired by hydrocarbon fluid liquid or gas or water fluid coming from the formation For instance in the patent WO 04/101951 a self-healing cement system includes cement, water and at least one additive that reacts and/or expands in contact with oil and gas from reservoir in the case of a structural failure in the set cement to provide a physical barrier in the zone of failure. The use of particles of polymer or other chemical products able to swell in oil in order to modify the properties of oilfield cement and to get an adaptive cement sheath after setting is disclosed. The use of polymeric particles to modify the mechanical properties of set cement is known. The self-healing effect is compatible with the flexibility. These additives have the effect of making the cement self-healing in the event of physical failure or damage such as micro-annuli. The self healing property is produced by the contact of the fluid itself, the potential repair mechanism is thus activated if and when needed in case of start of loss of zonal isolation.

Another example is the WO 04/101952 where a self-healing cement system includes cement, water and at least one additive that swells in contact with water from reservoir or from formation in the case of a structural failure in the set cement to provide a physical barrier in the zone of failure. The use of particles of super-absorbent polymer (SAP) or other chemical able to swell in water in cement slurry in order to modify the properties of oilfield cement and to get an adaptive cement sheath after setting is disclosed. Several SAP have been identified such as polyacrylamide and modified crosslinked poly(meth)acrylate.

The objective is to provide long-term zonal isolation with a sealing material having self-healing properties. It is an object of the present invention to provide another type of self-repairing and/or self-healing cement compositions.

SUMMARY OF THE INVENTION

The invention discloses a cementing composition for use in oilfield application, wherein a significant amount of cement is left intentionally un-hydrated when the cement is set; such that said amount of un-hydrated cement becomes hydrated when the set cement is damaged. The cement left un-hydrated means also that the cement does not react when the cement is setting. The set cement can be damaged when the integrity of the cement matrix is compromises: cracks, micro-cracks. Also, when the cement sheath is submitted to mechanical stresses that are higher than the tensile strength of the set cement the appearance of cracks and/or micro-annuli can occur. For each cement, depending on the wished density and cement properties, a critical percentage of water has to be added such that all added water reacts with the cement. When this percentage of water is lesser than what is expected, part of the cement does not react with the water and remains un-hydrated. The amount of cement left un-hydrated is at least 10% in mass of the total cement in the cementing composition. Preferably, the amount of cement left un-hydrated is more than 15%, 20% or 25%, more preferably is more than 30%, 35%, 40% or 45% and most preferably is more than 50%, 55% or 60%. In other examples, less suitable the amount of cement left un-hydrated is more than 65%, 70%, 75% or 80%. In quite suitable examples, the amount of cement left un-hydrated is more than 85% or 90%. The cementing composition is applied on oilfield application and has to be a pumpable slurry for oilfield application. Therefore the rheology of the cementing composition of the invention compared to conventional cementing composition with the same density has to be the same.

In a first embodiment, within the cementing composition, the cement is mixed with an oil-in-water emulsion and is stabilized with a surfactant. Preferably, the emulsion contains up to 50% by volume of oil.

In a second embodiment, within the cementing composition, the cement is mixed with an aqueous suspension of latex particles. Preferably, the latex particles is a styrene-butadiene latex, and more preferably, the suspension contains up to 45% by volume of latex. The latex suspension can be replaced by suspension of nano organic solid or nano inorganic solid to decrease the water in the slurry and thus to obtain a non fully hydrated cement. The advantage of the nano particles is to slightly affect the rheology of the slurries.

In a third embodiment, within the cementing composition, the cement is mixed in a mixture of water and solvent, wherein the solvent is highly miscible and does not react with the cement.

In a fourth embodiment, the particle size of the components used within the cementing composition is selected and the respective proportion of particles fractions is optimized such that at the same time the Packing Volume Fraction (PVF) of the solid of the cementing composition is the highest, and the water-to-cement ratio of the solid blend of the cementing composition is the lowest. Therefore, the cementing composition is a mixable and pumpable slurry with the minimum amount of water, i.e., at slurry Solid Volume Fraction (SVF) of 35-75% and preferably of 50-60%.

In a fifth embodiment, within the cementing composition, there are particles of cement that are coated with a coating layer. For instance the cement could be encapsulated inside a protective layer to prevent hydration.

Also, other components can be added to the cementing composition: flexible particles to get a flexible matrix, swellable particles that can swell with gas and/or oil and/or water, flexible additives that improve mechanical properties and thus prevent crack, and/or fibers to improve the toughness and to prevent crack creation and propagation.

BRIEF DESCRIPTION OF THE DRAWINGS

Further embodiments of the present invention can be understood with the appended drawings.

DETAILED DESCRIPTION

Figure 1:
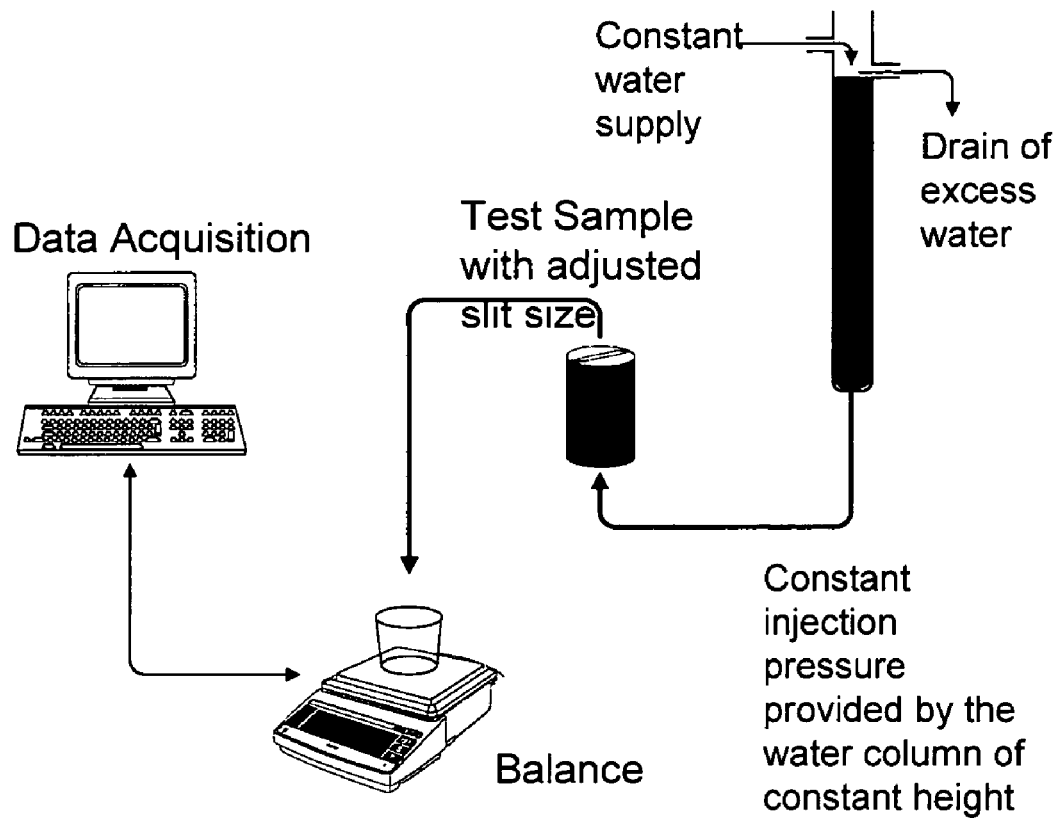
FIG. 1 shows the set-up principle to test the self-repairing properties of the cementing composition according to the invention.

The present invention relates to adaptive cement systems. In particular, the invention relates to cement systems which are "self-healing" or "self-repairing", i.e. system which can adapt to compensate for changes or faults in the physical structure of the cement, or which adapt their structure in the cementing of oil, gas, water or geothermal wells, or the like.

According to the invention, the fundamental idea for the cementing composition is to leave a significant amount of un-reacted cement (i.e. not hydrated) in the set cement sheath once all the water initially present in the cement slurry has reacted with the anhydrous cement. When the cement sheath is submitted to mechanical stresses that are higher than the tensile strength of set cement the appearance of cracks and/or micro-annuli can occur. In this case the water contained in the cracks or micro-annuli can react with un-reacted cement to form additional cement hydrates. These cement hydrates occupy more space than the anhydrous cement from which they are formed. Consequently, the cement hydrates can fill the cracks and/or micro-annuli, and the damaged cement self-repairs.

Portland cements are roughly composed of 80% calcium silicates, $Ca_3SiO_5$ and $Ca_2SiO_4$, 15% of calcium aluminate and calcium aluminoferrite, $Ca_3Al_2O_6$ and $Ca_4Al_2Fe_2O_{10}$, and 5% gypsum, $CaSO_4.2H_2O$. These cement phases react with water to form cement hydrates. For instance the hydration of calcium silicates leads to the formation of two hydrates, calcium silicate hydrate and calcium hydroxide. The chemical reactions can be written as follows:

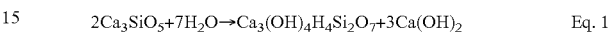

$$2Ca_3SiO_5 + 7H_2O \rightarrow Ca_3(OH)_4H_4Si_2O_7 + 3Ca(OH)_2 \qquad \text{Eq. 1}$$

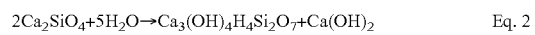

$$2Ca_2SiO_4 + 5H_2O \rightarrow Ca_3(OH)_4H_4Si_2O_7 + Ca(OH)_2 \qquad \text{Eq. 2}$$

The volume occupied by these two hydrates is much higher than that occupied by the anhydrous phases. The molar volume is estimated to be $153 \times 10^{-6}$ m$^3$ for $Ca_3(OH)_4H_4Si_2O_7$, $33.1 \times 10^{-6}$ m$^3$ for $Ca(OH)_2$, $72.4 \times 10^{-6}$ m$^3$ for $Ca_3SiO_5$ and $52.0 \times 10^{-6}$ m$^3$ for $Ca_2SiO_4$. From these values it can be calculated that the volume increase is 74% for $Ca_3SiO_5$ and 79% for $Ca_2SiO_4$. The volume increases due to the hydration of calcium aluminate and calcium aluminoferrite are in the same order of magnitude. Gypsum present in Portland cements reacts with these phases to form calcium trisulfoaluminate hydrate during the first hours of hydration and then calcium monosulfoaluminate hydrate. The amount of gypsum being not sufficient to convert all the calcium aluminate and calcium aluminoferrite into calcium monosulfoaluminate hydrate, some calcium aluminate hydrates are formed as well.

It is generally agreed that complete hydration of Portland cements cannot occur if the water-to-cement (W/C) weight ratio of the cement slurry is below a value in the region of 0.38. This means that 38 grams of water are required to fully hydrate 100 grams of Portland cement. In this case the water is distributed as follows: about 22 grams are chemically bonded into cement hydrates and 16 grams are present in the micropores of cement hydrates. If the W/C ratio is above 0.38 the water in excess is in the capillary pores (macropores) of the set cement matrix. It is easy to understand that some un-reacted cement remains in the cement matrix when the W/C ratio is below 0.38.

The plastic viscosity of oilwell cement slurries must be sufficiently low to allow proper placement of the slurry in the long narrow annulus. The plastic viscosity of slurries is primarily a function of both the solid volume fraction (percentage of total slurry volume that is provided by solid components) and the water-soluble polymers (e.g., dispersants, fluid-loss control agents . . . etc) that can be present in cement slurries. Consequently the W/C ratio of conventional cement slurries (i.e. cement plus water plus additives) cannot be decreased significantly without impairing their rheology. ISO/API Class G and H cements are generally mixed at respectively 1.89 and 1.97 kg/L density, corresponding to W/C ratio of 0.44 and 0.38. The addition of efficient dispersants enables to decrease the W/C ratio down to about 0.33, but slurries are very viscous and, therefore, may become difficult to pump. So it is not possible to keep significant amounts of un-reacted cement using conventional cement slurries.

Four possible solutions have been identified to decrease the W/C ratio of oilwell cement slurries without compromising their rheology.

In a first embodiment, the cement is mixed with an oil-in-water emulsion that is stabilized with a suitable surfactant.

The emulsion may contain up to 50% by volume of oil. It was shown that such emulsions also provide excellent fluid-loss control as well.

In a second embodiment, the cement is mixed with a concentrated aqueous suspension of latex particles, for example a styrene-butadiene latex. The latex suspension can contain up to 45% by volume of latex particles. The latex suspension can be replaced by suspension of nano organic solid or nano inorganic solid to decrease the water in the slurry and thus to obtain a non fully hydrated cement. The advantage of the nano particles is to slightly affect the rheology.

In a third embodiment, the cement is mixed with a mixture of water and solvent. The solvent must be highly miscible in water and should not react with the cement.

In a fourth and last embodiment, the particle size of the components used within the cementing composition is selected and the respective proportion of particles fractions is optimized in order to have at the same time the highest Packing Volume Fraction (PVF) of the solid blend, and obtaining a mixable and pumpable slurry with the minimum amount of water, i.e., at slurry Solid Volume Fraction (SVF) of 35-75% and preferably of 50-60%. More details can be found in European patent EP 0 621 247. A cementing composition blend composed of silicoaluminate cenospheres as coarse particles, Portland cement (e.g., ISO/API Class A, G or H) as medium particles, and either a microcement or microsilica as fine particles would be adequate. The cenospheres may also be replaced by a macrocement (i.e. high proportion of coarse particles, typically 200-300 microns), but such material is not commercially available. However, this optimization can have drawbacks for this application. Indeed the set cement matrix would have a high Young modulus owing to its low porosity, especially if a macrocement is used. This can result in a brittle material that would not be able to withstand high mechanical stresses.

In a fifth embodiment some part of the cement could be protected against water by a coating. For instance the cement could be encapsulated inside a protective layer to prevent its hydration and/or molecule can be adsorbed at the surface of cement particles such that hydrophobia of the cement is enhanced.

What is described in the present invention is valid for curing temperatures below 110° C. Indeed, above this temperature, other cement hydrates are formed (e.g., tobermorite, xonotlite . . . ).

This idea of having significant amount of unreacted cement (i.e not hydrated) can be associated with the idea of having flexible particles to get a flexible matrix or having swellable particles with hydrocarbon (gas and oil) and/or water. These swellable particles are for instance described in WO 04/101951 and WO 04/101952.

This idea is compatible with all additives that improve mechanical properties and thus that prevent crack can be added such as flexible additives and fibers to improve the toughness and to prevent crack creation and propagation.

EXAMPLES

Example 1

Slurry with Water/Oil Emulsion

Two slurries with an oil/water emulsion have been optimized. Slurry designs and properties are given in Table 1. The properties were measured according to standard API 10 (American Petroleum Institute) procedures. The cement slurries were composed of Dyckerhoff class G, black label type cement, water, oil, a dispersant agent and a surfactant. The dispersing agent was a polynaphthalene sulfonate in liquid form. The surfactant was a sulfated ethoxylated nonyl phenol. For design A the water-to-cement weight ratio is equal to 0.29 for design B the ratio decreases up to 0.37. To get a fully hydrated cement, the minimum water-to-cement weight ratio is equal to 0.38.

TABLE 1

Slurry design and properties for water/oil emulsion

| | Slurry | |
|---|---|---|
| | A | B |
| W/C | 0.29 | 0.37 |
| Density g/cm³ (lbm/gal) | 1.81 (15.1) | 1.61 (13.4) |
| SVF (%) | 38.2 | 30 |
| Cement g | 742.7 | 583 |
| Water g | 216 | 214 |
| Oil g | 116 | 159.5 |
| Dispersant g | 7.4 | 2.2 |
| Surfactant g | 2.9 | 4.1 |
| Properties | | |
| Rheology after mixing | | |
| PV in cP | 107 | 58 |
| Ty in lbf/100 sqft | 2 | 4.5 |
| Rheology at 60° C. | | |
| PV in cP | 63 | 46.3 |
| Ty in lbf/100 sqft | 2.8 | 13.9 |
| Free fluid Ml | 0 | 0 |
| ISO/API Fluid loss at 60° C. mL/250 mL of slurry | 52 | 34 |

Example 2

Slurry with Cement Blend at Different Particle Size

Two type of blends optimized from Packing Volume Fraction (PVF) have been studied. Designs are given in Table 2. In that case the water-to-cement weight ratio is very low and equal to 0.25 or to 0.26.

The cement slurries were composed of Dyckerhoff class G, black label type cement, of microfine cement, fine cement blend amorphous silica fume, a dispersant agent, an antifoam agent and water. The dispersing agent was a polynaphthalene sulfonate.

In both cases the water-to-cement weight ratios are very low and equal to 0.25 or to 0.26. The microfine cement, the fine cement blend and the amorphous silica fume will react also with water to form cement hydrates thus participating to low water-to-cement weight ratio.

TABLE 2

Slurry design and properties for cement blend

| | Slurry | |
|---|---|---|
| | Slurry 1 | Slurry 2 |
| Water to Total cement ratio | 0.25 | 0.26 |
| Density g/cm³ (lbm/gal) | 2.13 (17.8) | 2.08 (17.36) |
| Porosity (%) | 45 | 45 |
| Water g | 250 | 254 |
| Class G cement g | 150 | 214 |
| Micro cement g | 97 | 0 |
| Fine cement g | 757 | 667 |
| Amorphous silica fume g | 0 | 94 |

TABLE 2-continued

Slurry design and properties for cement blend

|  | Slurry | |
| --- | --- | --- |
|  | Slurry 1 | Slurry 2 |
| Dispersant g | 18.9 | 16.16 |
| Antifoam g | 2.28 | 2.43 |

Example 3

Characterization of Self-Healing Properties with Water

An experimental set-up was developed to follow up and evaluate the self-repair capability of the tested cement. The principle is based on water permeability measurement versus the time.

The selected process to crack the cement is quite severe because it consists to cut the tested samples in two halves. Equivalent tests have been carried out on high strength concrete (Ref H. W. Reinhard, M. Jooss Cement and Concrete Research 33 (2003) 981-985). This paper establishes permeability and self-healing behavior of cracked concrete as a function of temperature and crack width. They conclude that the decrease of the flowrate depends on crack width and temperature: as expected smaller cracks do heal faster than greater ones and higher temperature favors faster self-healing process.

The set-up consists of a constant pressure system which feeds the test cell with water at 0.08 bar. The principle is shown on FIG. 1. The test cell, in PVC, holds the test sample in place. The test sample is made of a cylindrical core of cement (2 inches diameter×2 inches length), cut in two halves longitudinally. The two halves are placed against each other, with the faces maintained at given space apart using a spacer. A mass balance records the water mass versus time throughout the injection test. The acquisition is done via a PC.

One spacer thickness has been used: the green spacer corresponds to 0.1 mm. Curing of cement samples were carried out at 20° C. as well as permeability measurement. It is assumed that the self healing capability is speed up at higher temperature and the measurement at low temperature gives a bottom line that will be improved at higher temperature.

Figure 2A:
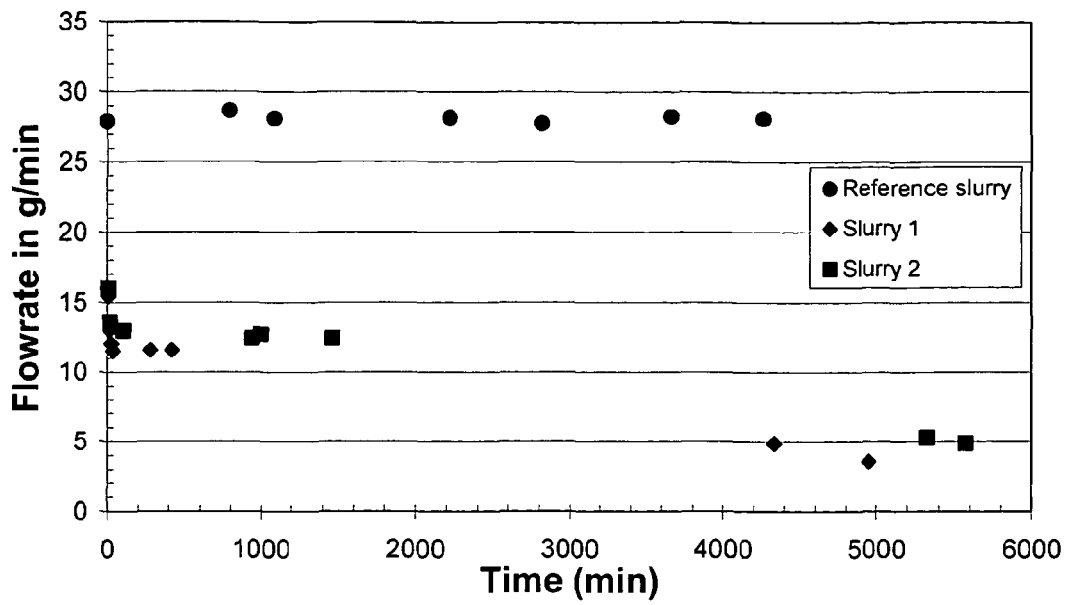
FIGS. 2A and 2B show graphs for the evolution of flow rate versus time for different cementing compositions.
Figure 2B:
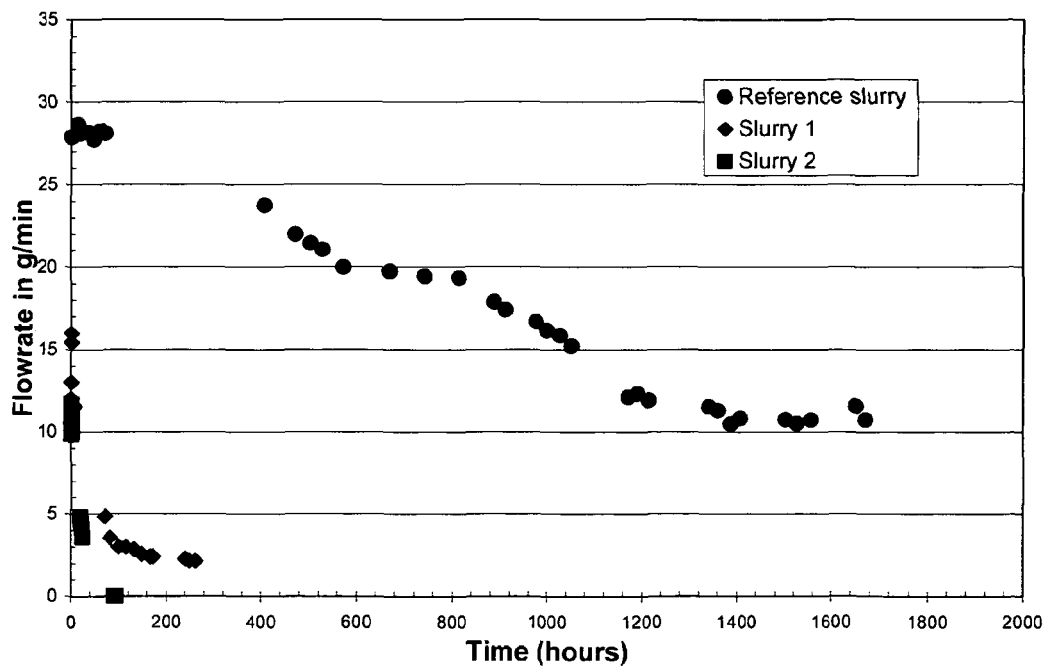

Several slurry systems have been tested: a reference slurry without any specific additives except an antifoam agent and a dispersant (15.8 lbm/gal slurry with 2.07 grams of an antifoam agent and a 3.44 grams of dispersant); a low water content including trimodal blend (see design in Table 2, slurry 2);

Results are displayed on FIGS. 2 and 3. The goal is to have a reference curve and to detect potential autogenous healing in reference. Results indicate that the flow rate reduction reaches 27% after 3 weeks (see FIG. 3) the same trend is observed whatever the tested water it means ordinary tap water or low hardness water. A significant decrease of flow rate is observed (FIGS. 2 and 3). Trimodal blend shows a superior behavior compared with the reference slurry.

Example 4

Characterization of Self-Healing Properties—Sticking Effect

Two slurry designs have been studied and compared: an oil design at 1.78 g/cm$^3$ (15 lbm/gal) (design named A and reported in Table 1) and a reference slurry without any specific additives except an antifoam agent and a dispersant (1.89 g/cm$^3$ (15.8 lbm/gal) slurry with 2.07 grams of an antifoam agent and 3.44 grams of dispersant).

The process to characterize the self-healing properties by a sticking effect consists of the following steps: for each design two 2 inches per 2 inches cubes are prepared and placed during one week in a thermostatic bath at 60° C. under atmospheric pressure. After one week a very thin slice of each cube is cut. It simulates the crack. The two cubes are then placed together (cut faces) without glue, they are maintained together by a rubber band around them and put again in a thermostatic bath at 60° C. under atmospheric pressure. These two cubes form a bar. At regular time basis, such bar is tested in flexion to measure the evolution of adhesion of the two cubes versus time. The peak load from the flexural strength is recorded versus time as parameter to quantify the repair of the matrix integrity.

The results illustrate that the design at low water-to-cement weight ratio (slurry A) with oil develops versus time higher flexural strength.

TABLE 3

Design A at 1.78 g/cm$^3$ (15 lbm/gal)

| Design | Time | Peak load N | Flexural strength MPa |
| --- | --- | --- | --- |
| A | 0 | 0 | |
|  | 6 weeks | 72.8 | 0.06 |
|  | 7 weeks | 114.8 | 0.1 |
|  | 8 weeks | 160.6 | 0.14 |
|  | 9 weeks | 176.9 | 0.15 |
|  | 23 weeks | 989.7 | 0.85 |

TABLE 4

Reference design at 1.89 g/cm$^3$ (15.8 lbm/gal)

| Design | Time | Peak load N | Flexural strength MPa |
| --- | --- | --- | --- |
| Neat | 0 | 0 | 0 |
|  | 4 months | 192 | 0.16 |

The invention claimed is:

1. A method for cementing a subterranean well, comprising:
    (i) preparing a slurry comprising cement, water, and an emulsion; and
    (ii) placing the slurry in the well,
    wherein the water-to-cement ratio is between 0.04 and 0.29 by weight, and the emulsion comprises an aqueous suspension of latex particles, a suspension of nano organic solids, a suspension of nano inorganic solids, or a combination thereof.

2. The method of claim 1, wherein the latex particles comprise styrene-butadiene.

3. The method of claim 1, wherein the slurry further comprises flexible particles, fibers, particles that swell in the presence of a hydrocarbon, particles that swell in the presence of water, or a combination thereof.

* * * * *